Patented June 23, 1936

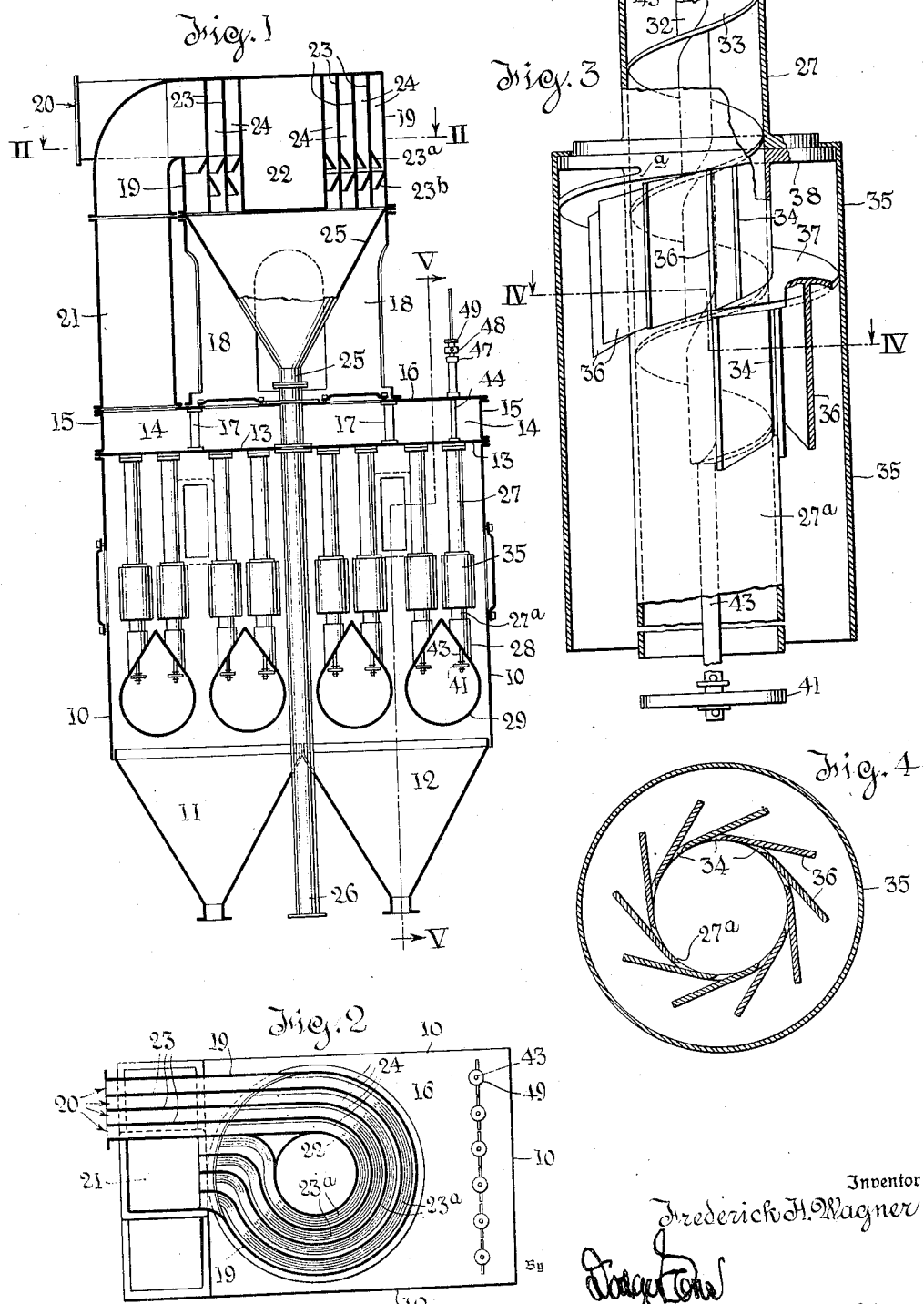

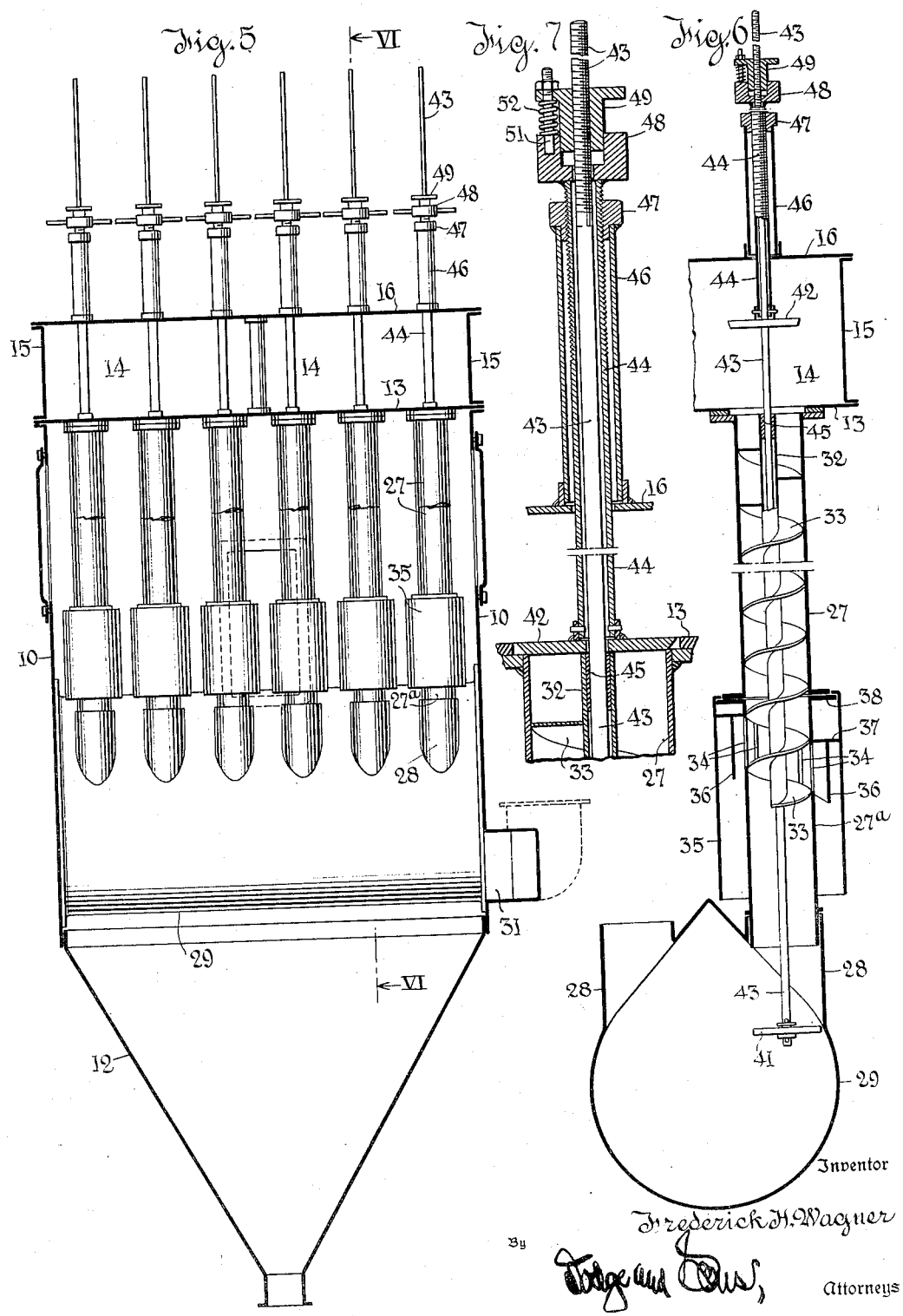

2,045,503

UNITED STATES PATENT OFFICE 2,045,503

DUST COLLECTOR

Frederick H. Wagner, Baltimore, Md., assignor to The Bartlett Hayward Company, Baltimore, Md., a corporation of Maryland Application January 17, 1935, Serial No. 2,296

8 Claims. (Cl. 183—85)

This invention pertains to dust collectors, and particularly to collectors of the centrifugal type, and preferably one in which the coarser particles are initially separated from the gas stream prior to the removal of the fine particles therefrom.

The main object of the invention is to produce not only a new form of apparatus wherein the coarser dust particles are removed from the gas stream, but also to provide a new type of separator for the fine particles, the arrangement being such in each case that notwithstanding variations or drop in pressure of the gas stream, the separated dust particles are prevented from being drawn back into the stream of cleaned gas.

With these and other objects and advantages in view reference will be had to the annexed drawings, wherein:—

Figure 1 is a vertical sectional view of one form of apparatus embodying my invention;

Fig. 2, a horizontal sectional view on the line II—II of Fig. 1;

Fig. 3, an enlarged sectional elevation of the lower portion of the fine dust separating means;

Fig. 4, a transverse sectional view on the line IV—IV of Fig. 3;

Fig. 5, a vertical sectional view on the line V—V of Fig. 1;

Fig. 6, a similar view of one of the tubular dust separating elements with the cut-off valves therefor shown as open; and Fig. 7, a vertical sectional view on an enlarged scale of the upper portion of such element and the associated valve actuating means.

In the drawings, the main body of the apparatus is shown as hollow and rectangular in cross section (see Fig. 2) and is formed by vertically disposed sides and ends 10, two funnel-shaped bottom sections 11 and 12, open at their lower ends, and a cover plate 13. Said plate 13 forms the bottom of a chamber 14 the side walls whereof are denoted by 15, while the top appears as 16. Suitable sustaining spacers 17 are interposed between elements 13 and 16 and their upper ends are preferably in line with the lower end or base of a hollow column-like member 18 placed centrally of top 16.

Said member forms the support for the initial dust separating or extracting means, the construction and form of which will be best understood upon reference to Figs. 1 and 2. It may be said to comprise a tubular member 19 closed at its top and open at its bottom, the inlet whereof is at 20, while the discharge end terminates or opens into the upper end of a trunk or duct 21, which at its lower end opens directly into chamber 14.

The innermost wall of the member 19 takes the form of a closed cylinder as 22 and located within and extending throughout the member 19 is a series of vertically disposed partitions 23, said partitions or walls being equidistantly spaced from each other and the walls of the member 19. Said partitions or walls at their inner portions circle or curve about member 22 with the axis thereof as a center, forming a series of passageways or chambers 24 open at their lower ends, which communicate with a funnel-shaped chamber 25, the upper end whereof is co-extensive with the open lower portion of the tubular member 19. A discharge pipe 26 for separated dust particles (mostly coarse) extends downwardly from the lower end of member 25 and out through the bottom of the structure (see Fig. 1).

Baffle plates or inclined aprons 23ª and 23ᵇ are arranged in each passageway, the former lying in a plane above the latter and the lower edge of each stopping short of the wall or partition toward which it projects. The angle of inclination of the aprons is such that dust which is thrown out of the gas stream will, when it contacts them, slide downwardly and into hopper 25 and out through discharge pipe 26. A vortical action is, of course, imparted to the various sub-divisions of the gas stream as the gas is forced or drawn through the passageways, which action serves to arrest and remove the larger dust particles. The gas thus partially cleaned enters duct 21 and passes into chamber 14, heretofore described.

Extending downwardly from said chamber and in direct communication therewith is a series of fine dust extracting elements, said elements and associated parts being alike in form and similarly lettered throughout.

Secured to the under face of plate 13 in line with an opening formed therein is a tubular member 27, the lower end whereof extends into a sleeve 28 extending upwardly from and opening into a trunk or chamber 29 extending longitudinally of the lower part of the apparatus. The trunks are preferably made ovocylindrical with the inverted V-shaped or pointed part uppermost and having oppositely arranged sleeves as 28 throughout their length. Said trunks are each provided with a gas outlet 31 and where a plurality of trunks are employed, they may be connected to a manifold.

Affixed to and extending centrally and downwardly through the major length of tube 27 and its lower extension or section 27ᵃ is a smaller tube 32, to which is affixed a worm-like flight or member 33, said member stopping short of the lower end of the tube section 27ᵃ. Said tube 27—27ᵃ is imperforate throughout its length except for dust passage slits or openings 34 (Figs. 4 and 6) adjacent the upper end of section 27ᵃ. Surrounding tube 27 at this portion and in spaced relation thereto is a cylindrical member or skirt 35, the lower end whereof opens into the body 10, while the upper end is closed, as best seen in Figs. 3 and 6.

Each dust passage 34 is formed at the base or inner edge of a vertically disposed plate 36, said plates (see Fig. 4) extending outwardly from one side of the passages in a direction tangential to the tube 27ᵃ. The upper edge of each plate, moreover, merges into a helical or spiral plate 37 which at its upper end is formed integral with a header 38. Said helical plate (see more particularly Fig. 3) may be said to start at *a* and to extend around the tube 27ᵃ, one or more turns. Such flight or helix is also, as will be best noted upon reference to Fig. 3, of such width as to extend completely across the space between the skirt 35 and the tube section 27ᵃ.

Under some circumstances, it may be advisable to shut down one or more of the tubes 27—27ᵃ and the allied parts, which, of course, would naturally cut down the capacity of the fine dust separating means. To this end, two valves as 41 and 42 are utilized (see Fig. 6), the former being attached to the lower end of a rod 43, and the latter to the lower end of a tubular member 44.

A bushing 45 having a polygonal opening complemental to the cross section of the rod is secured in the upper end of tube 32 and prevents the rod from turning while still being free to be moved therethrough. The upper portion of rod 43 is threaded, as is the upper external surface of the tubular member, the threads being right and left, respectively.

A column-like member 46 is secured to and extends upwardly from plate 16, surrounding member 44 and having secured in its upper end a nut 47 with which the member 44 engages and through which it extends. At its upper end member 44 has secured thereto an over-travel nut, embodying a socketed head or hand piece 48, a nut proper 49 threaded on the outer end of rod 43, and a yielding connection between the head and nut comprising a stake 51 with an encircling spring 52. Such arrangement permits one valve to seat in advance of the other, and the latter to be closed without difficulty or any strain upon the parts.

While the valve closing means has been shown in conjunction with one row of extractor tubes, valves and actuating mechanism as above set forth may be utilized with others.

It is thought that the operation and functioning of the parts will be readily appreciated from the foregoing, but a brief résumé will be given.

Dust laden gas is introduced into the centrifugal separator through inlet 20, and is immediately divided into a series of streams, each of which partakes of a swirling action on its way to the duct 21, which, of course, throws the heavier dust particles at least against the outermost wall of each duct. The dust gravitates, sliding onto and then off of the apron 23ᵃ, the upper apron precluding reflow or upward movement of the gas stream and, likewise, acting to deflect the incoming dust-laden gas against the outer wall. Such dust as is separated by this centrifugal passes into member 25 and is finally discharged through pipe 26.

Where the gas is relatively free of coarse dust particles, the centrifugal may be omitted and the gas to be cleaned introduced directly into the chamber 14 for treatment in one or more of the so-called tubular separators. From said duct or chamber 14, the gas passes into the upper end of tube 27 wherein it contacts the helix 33, which by reason of the swirling action that it imparts to the gas stream, acts to throw the dust particles outwardly into contact with the inner wall of the tube along and down which they gravitate and are advanced by the gas stream.

The particles finally reach the lower section 27ᵃ of the tube and are thrown outwardly through the slots or openings 34 and into contact with the tangentially disposed wings or vanes 36, which act to arrest the dust particles, such particles moving outwardly and downwardly of wings 36 finally dropping through the skirt 35 and to the underlying chamber. Meanwhile, the cleaned gas passes from the lower end of the tube into the trunk 29.

It will be observed that wherever an inclined surface is present in the path of movement of the gas stream, its angle is such that the dust will be freely movable thereover by the stream or as with the upper portions of the trunks or chambers 29, the angle of inclination insures gravitation of the dust particles therefrom. Preferably the lower section of the tubular separator, or that portion heretofore denominated as 27ᵃ, together with the associated elements, to wit, the wings or plates 36 and the overlying helix 37, will be made of abrasion-resistant material, inasmuch as these parts are the ones which are subjected to the greatest wear.

What is claimed is:

1. In a dust separator, the combination of a duct into which the gas to be cleaned is passed, said duct having at least one slot formed in the wall thereof; a plate extending freely into space and tangentially outward of the duct and to one side of the slot; and means for imparting a swirling movement to the gas stream as it passes through the duct, whereby the dust particles will be caused to move outwardly of the slot, impinge upon the plate and be arrested thereby, finally moving over and off the surface of the plate to the space below.

2. In a dust separator, the combination of a duct into which the gas to be cleaned is passed; a skirt surrounding the lower portion thereof and spaced laterally with relation thereto and open at its lower end; a helical plate located in the upper portion of the skirt, bridging the space between said duct and skirt and forming a helical passage about the duct, there being a series of elongated longitudinally extending slots opening through the wall of the duct into said passage; and a plate extending freely into space and outwardly in a tangential direction from said duct and to one side of and adjacent each slot, the plate at its upper edge merging into the helical plate aforesaid and the outer edge being spaced from the skirt.

3. In a dust separator, the combination of a duct; a helix mounted therein and forming a helical passageway through which the gas is caused to pass, there being a series of slots opening into the duct adjacent the lower portion of the helix; a skirt surrounding the lower portion of the duct and spaced laterally with relation thereto; a helix bridging the space between the outer wall of the duct and the inner wall of the skirt, said helix being coincident in position with the helix in the duct; and a series of plates extending tangentially from the duct into the space between the same and the skirt, there being one such plate for each opening.

4. A structure as set forth in claim 3, wherein the plates are connected at their upper ends to the last-named helix and stop short of the skirt at the outer edges.

5. In a dust separator, the combination of a duct into which the gas to be cleaned is passed; means located within the duct for imparting a swirling movement to the dust stream as it passes through the same; a series of longitudinally disposed slots formed in the wall of the duct adjacent the lower portion thereof, the walls of said slots standing in a substantial tangential relation to the axis of the duct; a plate extending outwardly from the duct to one side of each of said slots, each of said plates likewise standing tangentially with reference to the duct; and a helix surrounding said duct, said helix being connected to the upper edges of the aforesaid plates.

6. In a dust separator, the combination of a duct into which the gas to be cleaned is passed; a helix extending substantially throughout the length of said duct, the wall of the duct adjacent its lower end being provided with a series of longitudinally disposed slots, the walls whereof stand in a substantial tangential relation to the duct, said slots in longitudinal position following the helix aforesaid; a skirt surrounding the lower end of the duct and spaced laterally with relation thereto and open at its lower end; and a helical plate mounted within the upper portion of the skirt and surrounding the duct, the convolutions of said last-named helix being substantially coincident with that mounted within the duct and forming a channel extending around the duct and into which the slots open.

7. A structure as set forth in claim 6, wherein plates extend tangentially from the duct adjacent each of said openings, said plates at their upper edges merging into the last-named helix and stopping short at their outer edges of the skirt.

8. In an apparatus for separating dust from gases, the combination of a centrifugal separator for removing the coarser particle from the gas stream; an off-take for the partially cleaned gas, said off-take communicating with a chamber; at least one tubular member extending downwardly from said chamber and being in communication at its lower end with a cleaned gas off-take; means mounted within said tubular member for imparting a swirling movement to the gas stream passing downwardly therethrough; and means embodying a plurality of flat plates located adjacent the lower end of said tubular member and prior to its entrance into the cleaned gas off-take for separating the fine dust particles from the gas stream through the centrifugal action imparted to the stream in its passage downwardly through the tubular member.

FREDERICK H. WAGNER.